United States Patent
Menge et al.

(10) Patent No.: US 8,492,705 B2
(45) Date of Patent: Jul. 23, 2013

(54) RADIATION DETECTOR AND METHOD OF USING A RADIATION DETECTOR

(75) Inventors: Peter R. Menge, Chagrin Falls, OH (US); John C. Cooper, Jr., Katy, TX (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 366 days.

(21) Appl. No.: 12/908,378

(22) Filed: Oct. 20, 2010

(65) Prior Publication Data

US 2011/0095173 A1    Apr. 28, 2011

Related U.S. Application Data

(60) Provisional application No. 61/254,495, filed on Oct. 23, 2009.

(51) Int. Cl.
    *G01V 5/00*         (2006.01)

(52) U.S. Cl.
    USPC ........................................................ 250/262

(58) Field of Classification Search
    USPC ........................................................ 250/262
    See application file for complete search history.

(56) References Cited

U.S. PATENT DOCUMENTS

| | | |
|---|---|---|
| 5,023,450 A | 6/1991 | Gold |
| 5,083,124 A | 1/1992 | Nordstrom |
| 5,483,061 A | 1/1996 | Sloan |
| 5,483,070 A * | 1/1996 | Valenta ........................... 250/366 |
| 5,744,803 A | 4/1998 | Grodsinsky et al. |
| 5,884,234 A * | 3/1999 | Jorion et al. ..................... 702/66 |
| 7,157,681 B1 * | 1/2007 | Tetzlaff ........................... 250/207 |
| 8,173,954 B2 | 5/2012 | Duraj |
| 2007/0284518 A1 | 12/2007 | Randall |
| 2010/0116978 A1 * | 5/2010 | Stoller et al. ................... 250/262 |
| 2010/0231905 A1 | 9/2010 | Christian et al. |

OTHER PUBLICATIONS

G. Gerbier et al., "Pulse Shape Discrimination and Dark Matter Search with NaI(TI) Scintillator at the Laboratoire Souterrain de Modane," Astropart. Phys. 11, 287, dated 1999, 7 pages.

S. Yousefi, "Digital Pulse Shape Discrimination Methods for Triple-Layer Phoswich Detectors Using Wavelets and Fuzzy Logic," Abstract of the Thesis, dated May 29, 2008, 5 pages.

* cited by examiner

*Primary Examiner* — Christine Sung
(74) *Attorney, Agent, or Firm* — Abel Law Group, LLP; Robert N. Young (57) ABSTRACT

A radiation detector can include a photosensor to receive light via an input and to send an electrical pulse via an output in response to receiving the light. The radiation detector can also include a pulse analyzer to send an indicator to a pulse counter when the electrical pulse corresponds to a scintillation pulse and to not send the indicator to the pulse counter when the electrical pulse corresponds to a noise pulse. The pulse analyzer can be coupled to the output of the photosensor. A method can include receiving an electrical pulse at a pulse analyzer from an output of a photosensor and determining whether the electrical pulse corresponds to a scintillation pulse or a noise pulse, based on a pulse shape of the electrical pulse. The method can also include sending the electrical pulse to a pulse counter when the electrical pulse corresponds to a scintillation pulse.

16 Claims, 9 Drawing Sheets

RADIATION DETECTOR AND METHOD OF USING A RADIATION DETECTOR

CROSS-REFERENCE TO RELATED APPLICATION

This application claims priority under 35 U.S.C. §119(e) to U.S. Patent Application No. 61/254,495 entitled "Radiation Detector and Method of Using a Radiation Detector," by Menge et al., filed Oct. 23, 2009, which is assigned to the current assignee hereof and incorporated herein by reference in its entirety.

FIELD OF THE DISCLOSURE

The present disclosure is directed to radiation detectors and methods of using radiation detectors, particularly in scintillation systems used for industrial applications.

BACKGROUND

Radiation detectors are used in a variety of industrial applications. For example, scintillators are used for well logging in the oil and gas industry. Typically, scintillators have scintillator crystals made of an activated sodium iodide or other material that is effective for detecting gamma rays. Generally, the scintillator crystals are enclosed in casings or sleeves that include a window to permit radiation-induced scintillation light to pass out of the crystal package. The light passes to a light-sensing device, such as a photomultiplier tube. The photomultiplier tube converts the light photons emitted from the crystal into electrical pulses. The electrical pulses can be processed by associated electronics and may be registered as counts that are transmitted to analyzing equipment.

Radiation detectors are useful for well logging, because the measurement of radiation, such as gamma rays, allows users to analyze rock strata that surround a bore hole. Radiation detectors can be used in drilling apparatuses themselves, giving rise to the common practice of measurement while drilling (MWD) (or logging while drilling). Nonetheless, MWD applications often take place in severe environments characterized by large amounts of heat, vibration, and shock, which impact detector durability and accuracy.

Accordingly, the industry continues to need improvements in radiation detector devices.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Numerous innovative teachings of the present disclosure will be described with particular reference to exemplary embodiments. However, it should be understood that this class of embodiments provides only a few examples of the many advantageous uses of the innovative teachings herein. In general, statements made in the present disclosure do not necessarily limit any of the various claimed articles, systems, or methods. Moreover, some statements may apply to some inventive features but not to others.

In the description below, a flow-charted technique may be described in a series of sequential actions. The sequence of the actions and the party performing the steps may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for some or all of those devices.

Figure 1:
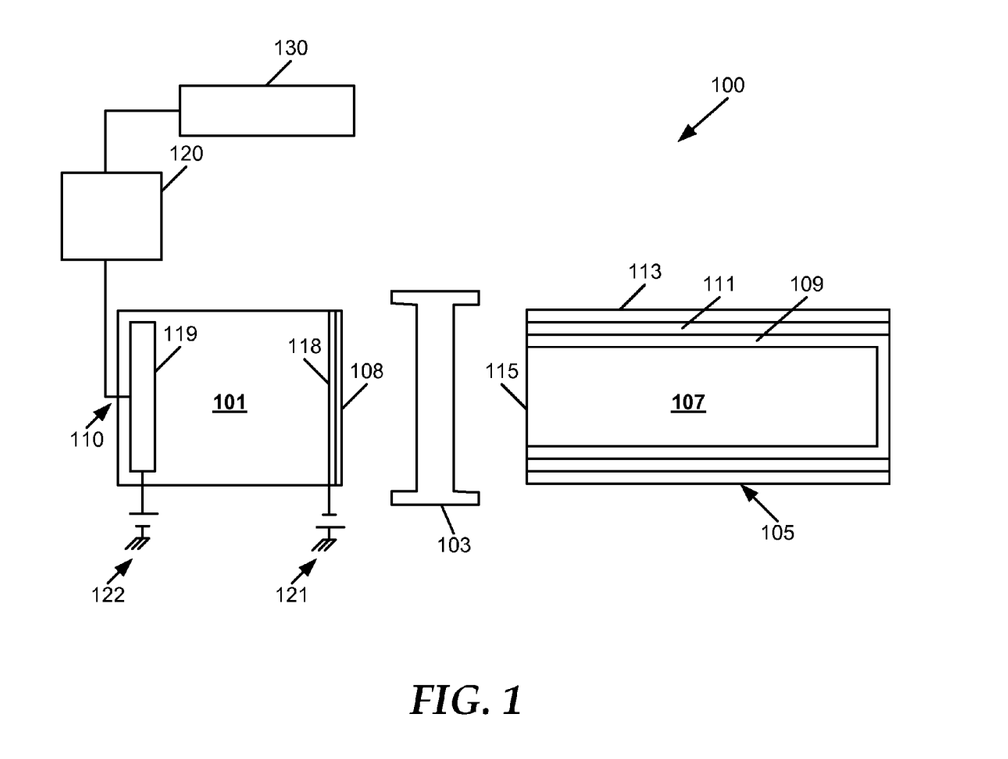
FIG. 1 is a block diagram illustrating a particular embodiment of a radiation detector.

FIG. 1 shows a particular embodiment of a radiation detector 100. The radiation detector 100 can include a photosensor 101 coupled to a scintillator 105. In one embodiment, the radiation detector 100 can include a light pipe 103. Though the photosensor 101, the light pipe 103, and the scintillator 105 are illustrated separate from each other, the photosensor 101 and the scintillator 105 can be coupled to each other directly or via the light pipe 103. In one embodiment, the scintillator 105 and the photosensor 101 can be coupled to the light pipe 103 using an optical gel, bonding agent, fitted structural components, or any combination thereof.

The photosensor 101 can include, for example, a photodiode, a photomultiplier tube (PMT), a hybrid PMT that includes a photocathode and a semiconductor electron sensor, or another suitable photosensor. The photosensor 101 can be housed within a tube or housing made of a material capable of protecting electronics associated with the photosensor 101, such as a metal, metal alloy, other material, or any combination thereof.

The photosensor 101 can include an input 108, such as an input window 108, and an output 110, such as an interface to receive a coaxial cable or other article to transmit electrical signals. The photosensor 101 can receive, via the input 108, light from the scintillator 105, other sources, or a combination thereof. Additionally, the photosensor 101 can be configured to send electrical pulses from the output 110 in response to light that the photosensor 101 receives.

The scintillator 105 can include a scintillating material 107 housed within a casing 113. For example, the scintillating material 107 can include a lanthanum bromide, a bismuth germanate, a sodium iodide, a cesium iodide, a lutetium yttrium orthosilicate (LYSO), or another scintillating material. The scintillating material 107 can include a dopant or other additive. In another embodiment, a gas tube that can emit scintillation light after receiving gamma radiation or other targeted radiation may be used. The casing 113 can be cylindrical or tubular to effectively fit the selected geometry of the scintillating material 107. The casing 113 can include a non-transmissive material, such as a metal, a metal alloy, or the like. In one embodiment, the casing 113 can include stainless steel or aluminum.

The scintillator 105 can also include a reflector 109. In one embodiment, a shock-absorbing member 111 can be disposed between the casing 113 and the reflector 109. Further, the casing 113 can include an output window 115 that is interfaced to an end of the scintillating material 107. The output window 115 can include glass, alumina or another transparent or translucent material suitable to allow photons emitted by the scintillator 105 to pass toward the photosensor 101. In an illustrative embodiment, an optical interface, such as clear silicone rubber, can be disposed between the scintillating material 107 and the output window 115. The optical interface can be polarized to align the reflective indices of the scintillating material 107 and the output window 115.

As illustrated, the light pipe 103 can be disposed between the photosensor 101 and the scintillator 105 and can facilitate optical coupling between the photosensor 101 and the scintillator 105. In one embodiment, the light pipe 103 can include a quartz light pipe, plastic light pipe, or another light pipe. In another embodiment, the light pipe 103 can comprise a silicone rubber interface that optically couples an output window 115 of the scintillator 105 with the input 108 of the photosensor 101. In some embodiments, multiple light pipes can be disposed between the photosensor 101 and the scintillator 105.

The output 110 of the photosensor 101 is coupled to a pulse analyzer 120. The pulse analyzer 120 and its operation are described in further detail later in this specification. The pulse analyzer 120 is coupled to a pulse counter 130 that counts photons received at the photosensor 101 based on electrical pulses output by the photosensor 101 and analyzed by the pulse analyzer 120. As shown in FIG. 1, the pulse analyzer 120 can be coupled between the photosensor 101 and the pulse counter 130. The pulse counter 130 can include, for example, a simple scaler, a multi-channel analyzer (MCA), or another device. In another particular embodiment, the pulse analyzer 120 and the pulse counter 130 can be included in a single device, such as an integrated circuit that includes both the pulse analyzer 120 and the pulse counter 130.

In a particular, illustrative embodiment, the photosensor 101 can be configured to receive light from the scintillator 105 via the input 108, and the photosensor 101 can be configured to output an electrical pulse to the pulse analyzer 120 via the output 110. For instance, photons included in the light can strike a photocathode 118 of the photosensor, and the photocathode 118 can emit electrons in response. The electrons can be collected at an anode of the photosensor, and the photosensor 101 can output an electrical pulse or signal to the pulse analyzer 120 via the output 110.

In an example, electrons in a valence band of the photocathode 118 can absorb photon energy when light passes through the input window 108 and strikes the photocathode 118. The electrons become excited until they are emitted as electrons from a surface of the photocathode 118 that is opposite the input window 108. In a particular embodiment, the surface of the photocathode 118 can include a layer of electropositive material that can facilitate emission of the electrons from the surface of the photocathode 118.

In an illustrative embodiment, a first voltage 121, such as a supply voltage or other voltage, can be applied to the photocathode 118. Electrons emitted from the surface of the photocathode 118 can be accelerated, by the first voltage 121, to strike the surface of an electron detector 119. In addition, a second voltage 122, such as a reverse bias voltage or other voltage, can be applied to the electron detector 119. Energy from electrons entering the electron detector can produce carriers that are removed from the electron detector 119 by the reverse bias voltage 122, creating an electrical current.

The photosensor 101 can receive scintillation light emitted by the scintillator 105 as a result of the scintillating material 107 receiving gamma radiation or other targeted radiation. An electrical pulse emitted by the photosensor 101 after receiving scintillation light is referred to herein as a "scintillation pulse." The photosensor 101 can also receive light emitted by the scintillator 105, emit an electrical pulse, or any combination thereof, as a result of a vibration of a scintillating material, a shock to the scintillating material, a pressure applied to the scintillating material, a potential change across the scintillating material, a static discharge within the radiation detector, a temperature of the photosensor, a temperature of the scintillation material, a plurality of scintillation pulses that overlap, or any combination thereof. An electrical pulse emitted by the photosensor 101 after any such non-scintillation condition is referred to herein as a "noise pulse."

The pulse analyzer 120 can be configured to send the electrical pulse, a replicate of the electrical pulse, another indicator, or any combination thereof, (collectively and individually referred to hereinafter as an "indicator") to the pulse counter 130 when the electrical pulse received from the photosensor 101 corresponds to a scintillation pulse. The pulse analyzer 120 can be configured to not send the indicator to the pulse counter 130 when the electrical pulse received from the photosensor 101 corresponds to a noise pulse. The pulse analyzer 120 can be tuned based on a portion of the scintillation pulse corresponding to a scintillating material included in a scintillator coupled to the photosensor. For example, the pulse analyzer 120 can be tuned to recognize a relatively faster rise time as indicating a scintillation pulse for a scintillating material, such as a lanthanum bromide or a bismuth germanate, and the pulse analyzer can be tuned to recognize a relatively slower rise time as indicating a scintillation pulse for a scintillating material, such as a sodium iodide, a cesium iodide or a LYSO.

Figure 2:
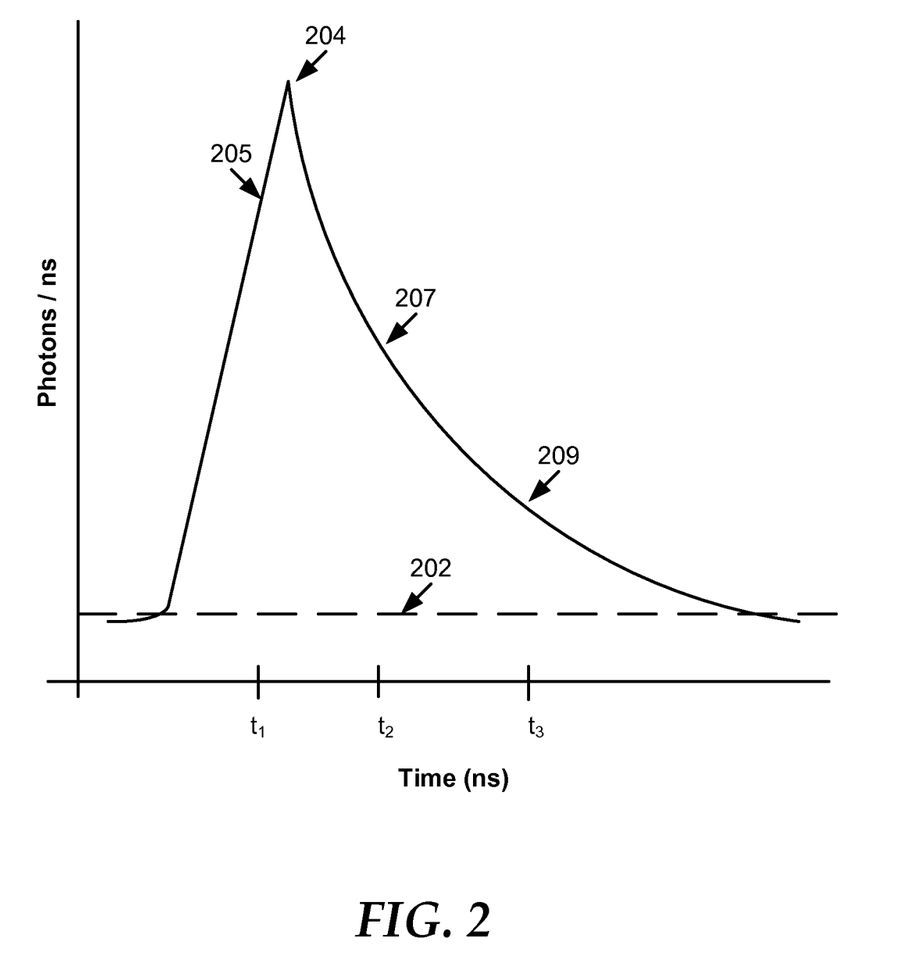
FIG. 2 is a plot illustrating a particular embodiment of a shape of a scintillation pulse.

The pulse analyzer 120 can include a module to identify an electrical pulse as corresponding to a scintillation pulse or to a noise pulse based on a shape of the electrical pulse. The shape can include a rise, a decay, another portion, or any combination thereof. For instance, as illustrated in FIG. 2, the rise can include readings from when the electrical pulse initially exceeds a threshold 202 up to a peak 204 of the electrical pulse. The decay can include readings from the peak 204 of the electrical pulse to a later time when the electrical pulse is at or below the threshold 202. A "rise time" can refer to an amount of time over which a rise occurs. A "decay time" can refer to an amount of time over which a decay occurs.

In an example, a scintillation pulse emitted by the photosensor 101 can have a shape that includes a relatively fast rise and an exponential decay, as illustrated in FIG. 2. In an embodiment, the shape of a scintillation pulse can substantially correspond to a mathematical expression, such as Summation 1, below:

$$\sum_i \kappa_i \left[ \text{Exp}\left(-\frac{t-t_o}{\tau_{di}}\right) - \text{Exp}\left(-\frac{t-t_o}{\tau_{ri}}\right) \right] + a_i \quad \text{(Summation 1)}$$

Summation 1 is a general expression approximating the shape a scintillation pulse, where $\kappa$ and a are constants to be fit to an electrical pulse using a least-squares fit, $t_o$ is the time of the beginning of the pulse, $\tau_d$ is a time constant describing the pulse decay and $\tau_r$ is a time constant describing the rise of the pulse. The summation is performed over one or more different sets of time constants that may exist within the pulse.

In an illustrative embodiment, the shape of an electrical pulse can correspond to a scintillation pulse when the shape includes a slope of at least approximately 10 photon/ns during a rise of the electrical pulse. In another illustrative embodiment, the shape of an electrical pulse can correspond to a scintillation pulse when a decay time of the pulse is at least 10 ns.

Figure 3:
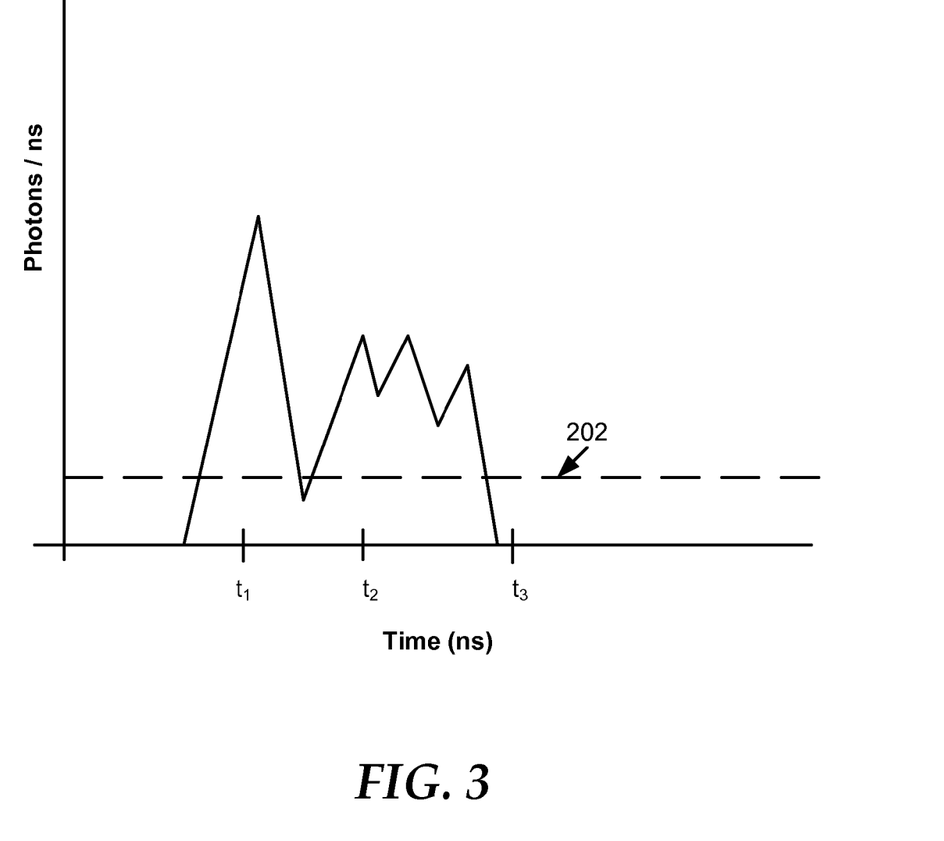
FIG. 3 is a plot illustrating a particular embodiment of a shape of a noise pulse.
Figure 4:
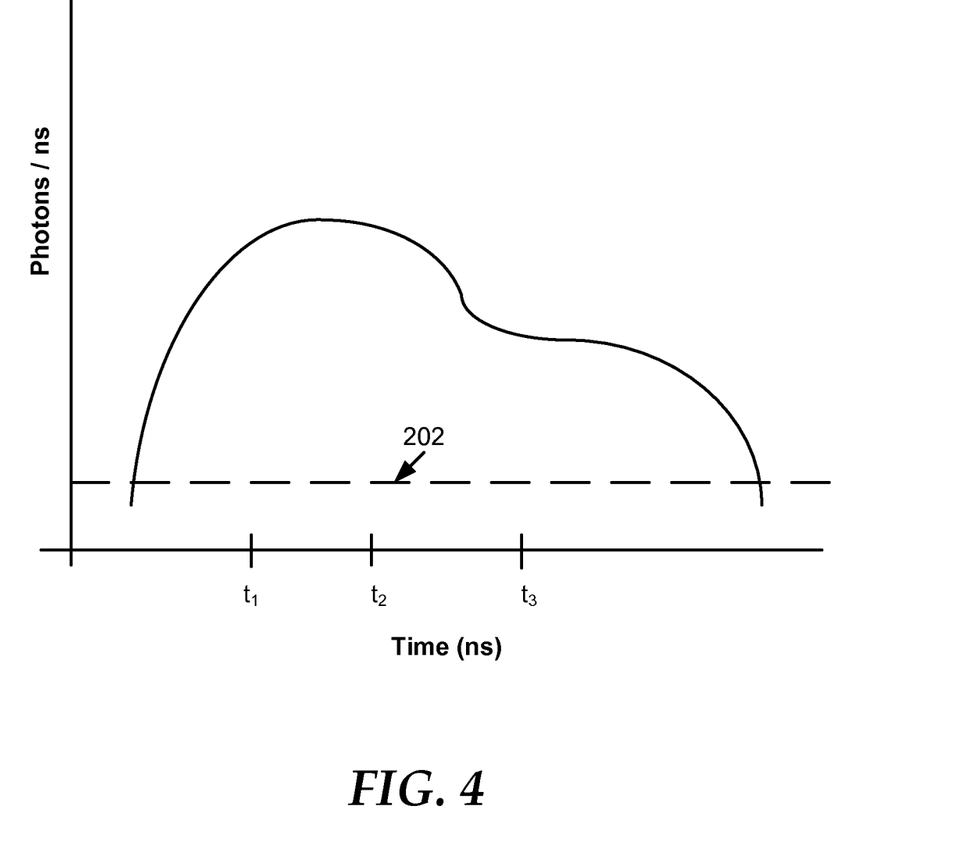
FIG. 4 is a plot illustrating a particular embodiment of a shape of another noise pulse.

In contrast, a noise pulse output by the photosensor 101 after receiving non-scintillation light can have a shape that differs from the shape of a scintillation pulse. For example, the shape of a noise pulse from static discharge within the radiation detector or shock to the scintillating material can include a fast rise and fast or random decay, as illustrated in FIG. 3. In another example, the shape of a noise pulse from vibration can have a shape that includes a slow rise, a slow decay or any combination thereof, as illustrated in FIG. 4.

The pulse analyzer 120 can be used to determine whether an electrical pulse corresponds to a scintillation pulse or a noise pulse. In a particular embodiment, the pulse analyzer 120 can include a digital circuit to digitize the electrical pulse output by the photosensor 101. For instance, the digital circuit can digitize the electrical pulse into different bins that are at most approximately 5 ns apart, such as bins that are at most approximately 2 ns apart. As a result, the digital circuit can be used with fast pulsing scintillating materials, such as a lanthanum bromide or a polyvinyltoluene doped with p-terphenyl. The digital circuit can also be used with another material, such as a bismuth germanate.

Figure 5:
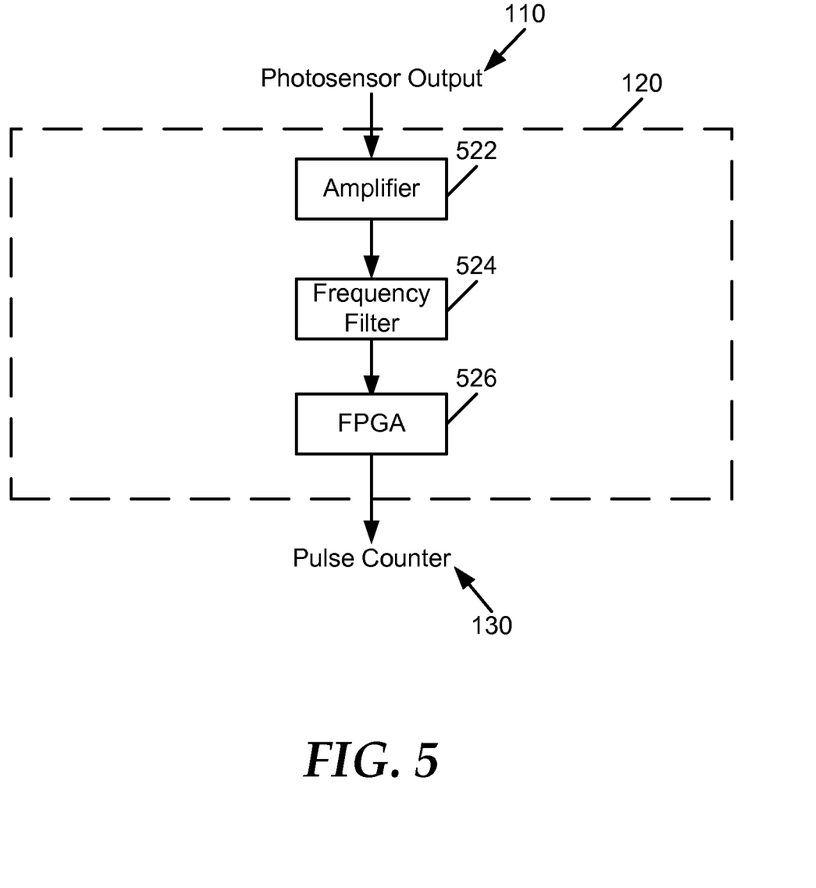
FIG. 5 is a block diagram illustrating a particular embodiment of a pulse analyzer.

The digital circuit can analyze a portion of the electrical pulse and determine whether the shape of the electrical pulse corresponds to a scintillation pulse or a noise pulse. For example, as illustrated in FIG. 5, the pulse analyzer 120 can include an amplifier 522 coupled to the photosensor output 110, such that an electrical pulse from the photosensor output 110 can be amplified prior to analysis. A frequency filter 524, such as a high pass filter, a low pass filter, or any combination thereof, can be coupled to the amplifier 522, such that some electrical pulses corresponding to noise pulses can be discarded without analysis by a field programmable gate array (FPGA) 526. The FPGA 526 can include logic to analyze the shape of the electrical pulse and to determine whether the electrical pulse corresponds to a scintillation pulse or a noise pulse. In a particular embodiment, the FPGA 526 can operate at a frequency of at least approximately 100 MHz in order to process electrical pulses resulting from scintillation light emitted by fast scintillating materials.

In an illustrative embodiment, a digital circuit of the pulse analyzer 120 can identify an electrical pulse as corresponding to the scintillation pulse or to the noise pulse based on readings during a rise time of the electrical pulse. For instance, the circuit can identify the electrical pulse as a scintillation pulse when the rise time of the electrical pulse is at most approximately 50 ns. In another illustrative embodiment, the circuit can be configured to identify the electrical pulse as corresponding to the scintillation pulse or to the noise pulse based on a decay time of the electrical pulse. For instance, the circuit can be configured to identify the electrical pulse as a scintillation pulse when the decay time of the electrical pulse is at least approximately 10 ns.

In another embodiment, the digital circuit can identify the electrical pulse as corresponding to the scintillation pulse or to the noise pulse based on a rise time of the electrical pulse as compared to a decay time of the electrical pulse. For instance, the electrical pulse can be identified as corresponding to the scintillation pulse when the decay time is at least 5 ns longer than the rise time. In another example, the electrical pulse can be identified as corresponding to the scintillation pulse when a ratio of the rise time to the decay time is at most approximately 5. In a particular embodiment, the ration of the rise time to the decay time can be at most approximately 0.5. In a further example, the electrical pulse can be identified as corresponding to the scintillation pulse when a ratio of photons/ns associated with a rise of the electrical pulse, to photons/ns associated with a decay of the electrical pulse, is at least approximately 2.

TABLE 1, below, illustrates an example embodiment of logic that can be used by the pulse analyzer 120 to determine whether an electrical pulse corresponds to a scintillation pulse or a noise pulse. The pulse analyzer 120 can calculate a ratio of rise time to decay time for an electrical pulse and compare the ratio to an expected ratio for a scintillation pulse, within a tolerance, such as 0.1.

TABLE 1

|  | Rise Time (ns) | Decay Time (ns) | Ratio | Result |
| --- | --- | --- | --- | --- |
| Expected | 2 | 10 | 0.2 | — |
| Pulse 1 | 1.5 | 1.5 | 1 | Noise |
| Pulse 2 | 3 | 11 | 0.27 | Scintillation |

TABLE 2, below, illustrates another example embodiment of logic that can be used by the pulse analyzer 120 to determine whether an electrical pulse corresponds to a scintillation pulse or a noise pulse. The pulse analyzer 120 can calculate a slope of a distribution of readings of photons over time for an electrical pulse. The pulse analyzer 120 can compare a slope direction at various times to that expected for a scintillation pulse to determine whether the electrical pulse is a scintillation pulse or a noise pulse.

TABLE 2

|  | $t_1$ | $t_2$ | $t_3$ | $t_4$ | $t_5$ | $t_6$ | Result |
|---|---|---|---|---|---|---|---|
| Expected | + | + | + | – | – | nil | — |
| Pulse 1 | + | – | nil | nil | nil | nil | Noise |
| Pulse 2 | + | + | – | – | + | – | Noise |
| Pulse 3 | + | + | + | – | – | nil | Scintillation |

The examples above are merely to illustrate and not limit the concepts described herein. Other embodiments, such as use of amplitude of a portion of the electrical pulse, another comparison of portions of the electrical pulse, another aspect of the electrical pulse, or any combination thereof, may be used. For example, in another embodiment, the pulse analyzer 120 can perform a least-squares fit to an electrical pulse using Summation 1, above. If a linear coefficient of the least-squares fit to the electrical pulse is less than a threshold, such as 0.85, the pulse analyzer 120 can determine that the electrical pulse corresponds to a noise pulse.

The digital circuit of the pulse analyzer 120 can be adapted to send an indicator to the pulse counter 130 when the electrical pulse output by the photosensor 101 corresponds to a scintillation pulse and to not send the indicator to the pulse counter 130 when the electrical pulse does not correspond to a scintillation pulse, such as when the electrical pulse corresponds to a noise pulse.

Figure 6:
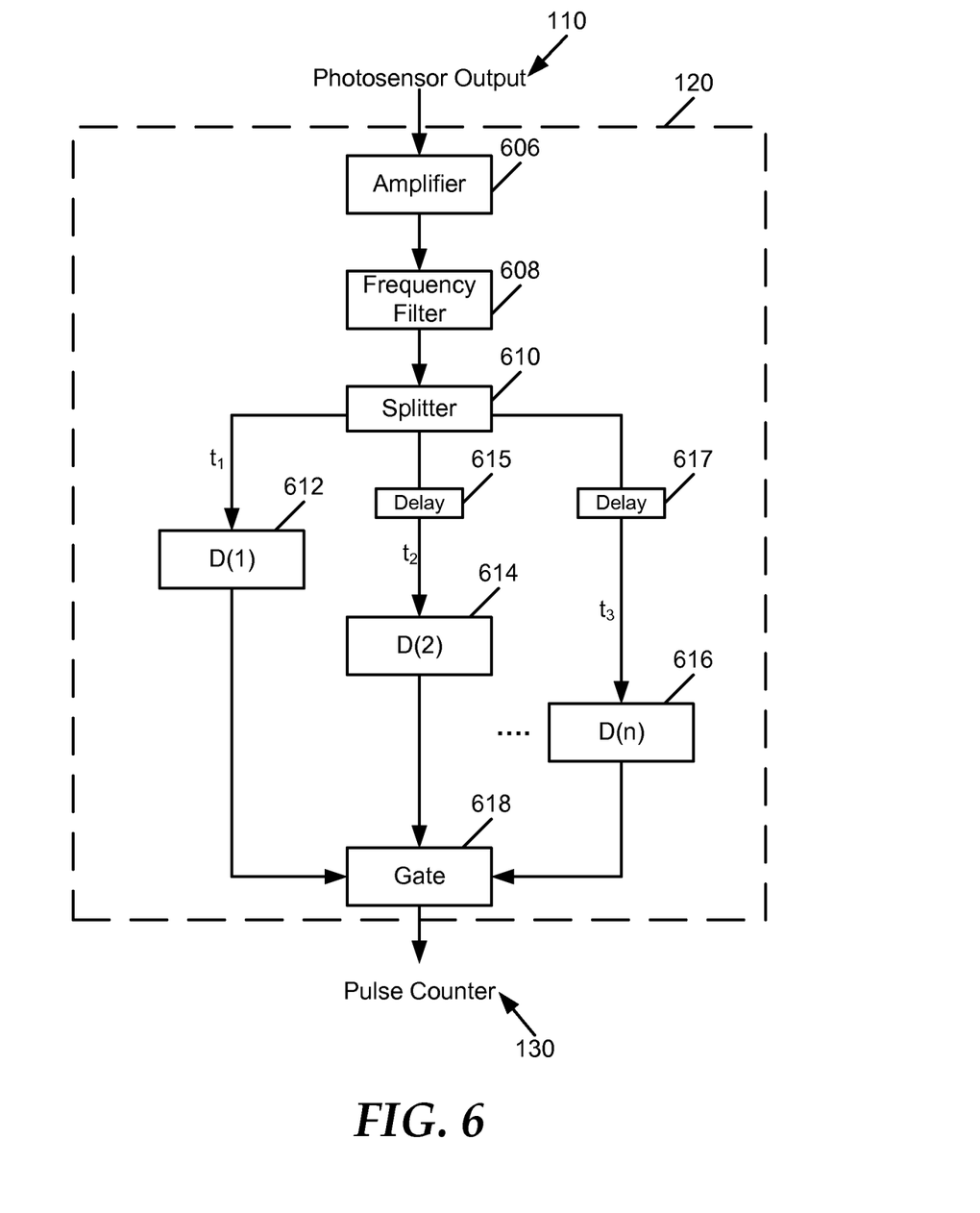
FIG. 6 is a block diagram illustrating another particular embodiment of a pulse analyzer.

In another embodiment, the pulse analyzer 120 can include an analog circuit configured to substantially prevent an indicator from being received at the pulse counter when the electrical pulse corresponds to a noise pulse. For instance, as illustrated in FIG. 6, the pulse analyzer 120 can include a splitter 610 to replicate an electrical pulse received from the photosensor output 110 and to send a replicate of the electrical pulse to each of a plurality of discriminator circuits, such as a discriminator circuit 612 and another discriminator circuit 614. The plurality of discriminator circuits can also include an additional discriminator, designated generally as an nth discriminator circuit 616.

Each discriminator circuit can be configured to receive a replicate of the electrical pulse at a different time. In a particular embodiment, the discriminator circuit 612 can receive a replicate of the electrical pulse directly from the splitter 610, whereas the discriminator circuit 614 can receive another replicate of the electrical pulse via a delay 615. Further, the nth discriminator circuit 616 can receive an additional replicate of the electrical pulse via an additional delay 617. In an illustrative embodiment, a delay can include an analog delay circuit, such as an inductor having an inductance or a resistor-capacitor circuit having a resistance-capacitance (RC) time constant. The delay 615 can have a lower inductance or RC time constant than the delay 617, such that the discriminator circuit 614 receives the other replicate of the electrical pulse before the nth discriminator circuit 616 receives the additional replicate of the electrical pulse.

Each discriminator circuit compares a different portion of the electrical pulse to a threshold of the discriminator circuit. For instance, because the discriminator circuit 612 receives a replicate of the electrical pulse directly from the splitter, it can compare a portion of the electrical pulse at a time $t_1$, such as a reading at 205 in FIG. 2, to a threshold of the discriminator circuit 612. Because the discriminator circuit 614 receives another replicate of the electrical pulse after the discriminator circuit 612, the discriminator circuit 614 can compare a portion of the electrical pulse at a time $t_2$, such as a reading at 207 in FIG. 2, to a threshold of the discriminator circuit 614. The nth discriminator circuit 616 can receive another replicate of the electrical pulse after the discriminator circuit 614, and the nth discriminator circuit 616 can compare a portion of the electrical pulse at a time $t_3$, such as a reading at 209 in FIG. 2, to a threshold of the nth discriminator circuit 616.

A discriminator circuit can be configured to output a signal when a portion of the electrical pulse meets or exceeds a threshold of the discriminator circuit. In a particular embodiment, a threshold of a discriminator circuit can be configured to determine whether a reading at a portion of the electrical pulse, as compared to a reading at or near a peak of the electrical pulse, exceeds a target percentage or other proportion. Thus, outputs of the discriminator circuits 612-616 can indicate a shape of the electrical pulse. The electrical pulse can correspond to a scintillation pulse when each of a subset of the plurality of discriminator circuits determines that a portion of the electrical pulse exceeds its threshold. For instance, where a threshold of the discriminator circuit 612 corresponds to a reading of 80% of the reading at or near the peak, a threshold of the discriminator circuit 614 corresponds to a reading of 50% of the reading at or near the peak, and a threshold of the discriminator circuit 616 corresponds to a reading of 25% of the reading at or near the peak, the discriminator circuits 612-616 would each output a signal in response to receiving a replicate of the scintillation pulse illustrated in FIG. 2. Whereas, the discriminator circuits 612-616 would not all output signals in response to receiving a replicate of the noise pulse illustrated in FIG. 3 or FIG. 4.

In another embodiment, the outputs of another subset of discriminator circuits can indicate that an electrical pulse is not a scintillation pulse. For instance, a particular subset of discriminator circuits may only compare readings during a rise of the electrical pulse to thresholds, and the other subset of discriminator circuits can compare readings during a decay of an electrical pulse to thresholds. If outputs of the other subset of discriminator circuits do not indicate that the decay substantially corresponds to a scintillation pulse, then the electrical pulse can be determined to be a noise pulse, despite the particular subset of discriminator circuits that indicate that a rise of the electrical pulse substantially corresponds to a scintillation pulse.

TABLE 3, below, illustrates a non-limiting example embodiment of discriminator output values (yes/no) that can indicate whether an electrical pulse corresponds to a scintillation pulse or a noise pulse.

TABLE 3

|  | D(1) | D(2) | D(3) | D(4) | D(5) | D(6) | Result |
|---|---|---|---|---|---|---|---|
| Expected | Y | Y | Y | Y | Y | Y | — |
| Pulse 1 | Y | Y | Y | N | N | Y | Noise |
| Pulse 2 | Y | Y | N | N | N | N | Noise |
| Pulse 3 | Y | Y | Y | Y | Y | Y | Scintillation |

In a particular embodiment, the pulse analyzer 120 can include a gate 618 coupled to the plurality of discriminator circuits 612-616. The gate 618 is configured to substantially prevent an indicator from being received at the pulse counter 130 when outputs of the plurality of discriminator circuits 612-616 indicate that a shape of an electrical pulse does not correspond to a scintillation pulse.

Figure 7:
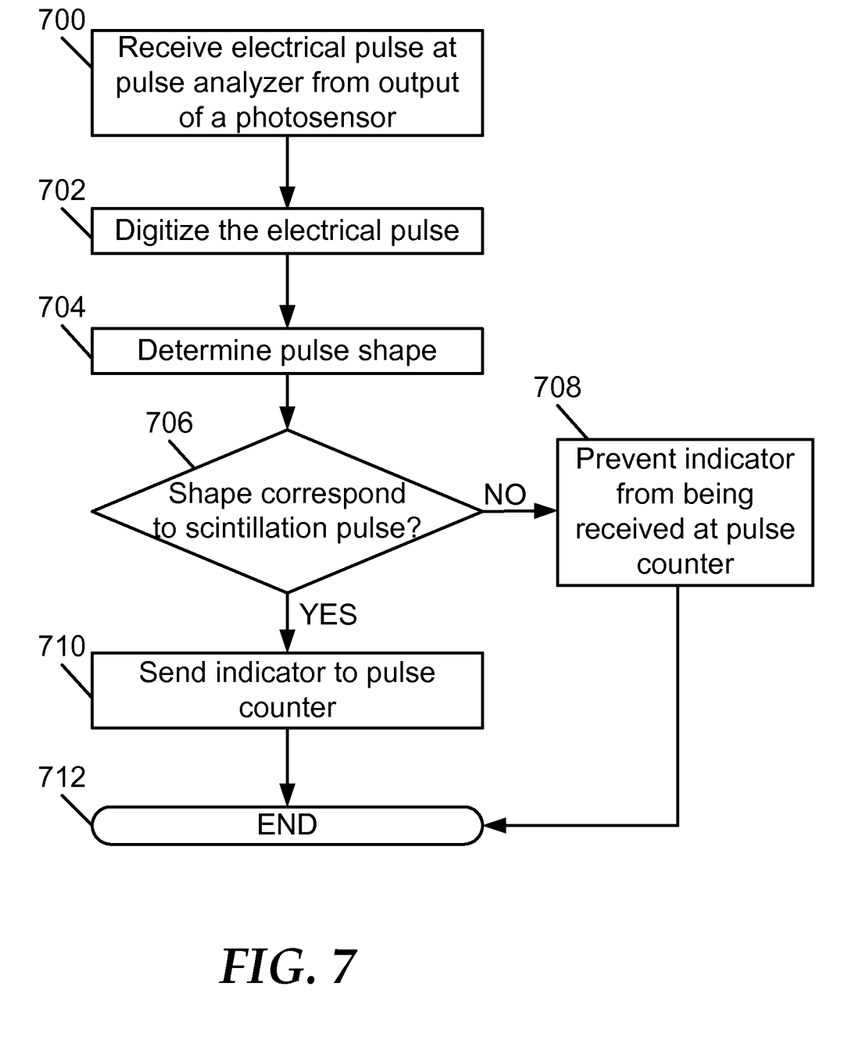
FIG. 7 is a flow diagram illustrating a particular embodiment of a method of sensing noise at a radiation detector.

FIG. 7 illustrates a particular embodiment of a method of using a radiation detector. At block 700, a pulse analyzer receives an electrical pulse from a photosensor. Moving to block 702, the pulse analyzer can digitize the electrical pulse. In one embodiment, the pulse analyzer can include a digital circuit, such as a field programmable gate array (FPGA). Proceeding to block 704, the pulse analyzer determines a shape of the electrical pulse. For instance, the FPGA or other digital circuit can include logic to determine the shape by analyzing a portion of the electrical pulse, such as a rise, a decay, a peak, a ratio or other comparison, such as a ratio of rise time to decay time, a comparison of the electrical pulse to a curve fit of the form of Summation 1, as described previously, or any combination thereof.

Continuing to decision node 706, the pulse analyzer determines whether the shape of the electrical pulse corresponds to a scintillation pulse. If the shape does not correspond to a scintillation pulse, such as when the shape of the electrical pulse corresponds to a noise pulse, the method can advance to block 708, and the pulse analyzer substantially prevents an indicator from being received at a pulse counter. Conversely, if the shape corresponds to a scintillation pulse, the method moves to block 710, and the pulse analyzer sends an indicator to the pulse counter. The method ends at 712.

Figure 8:
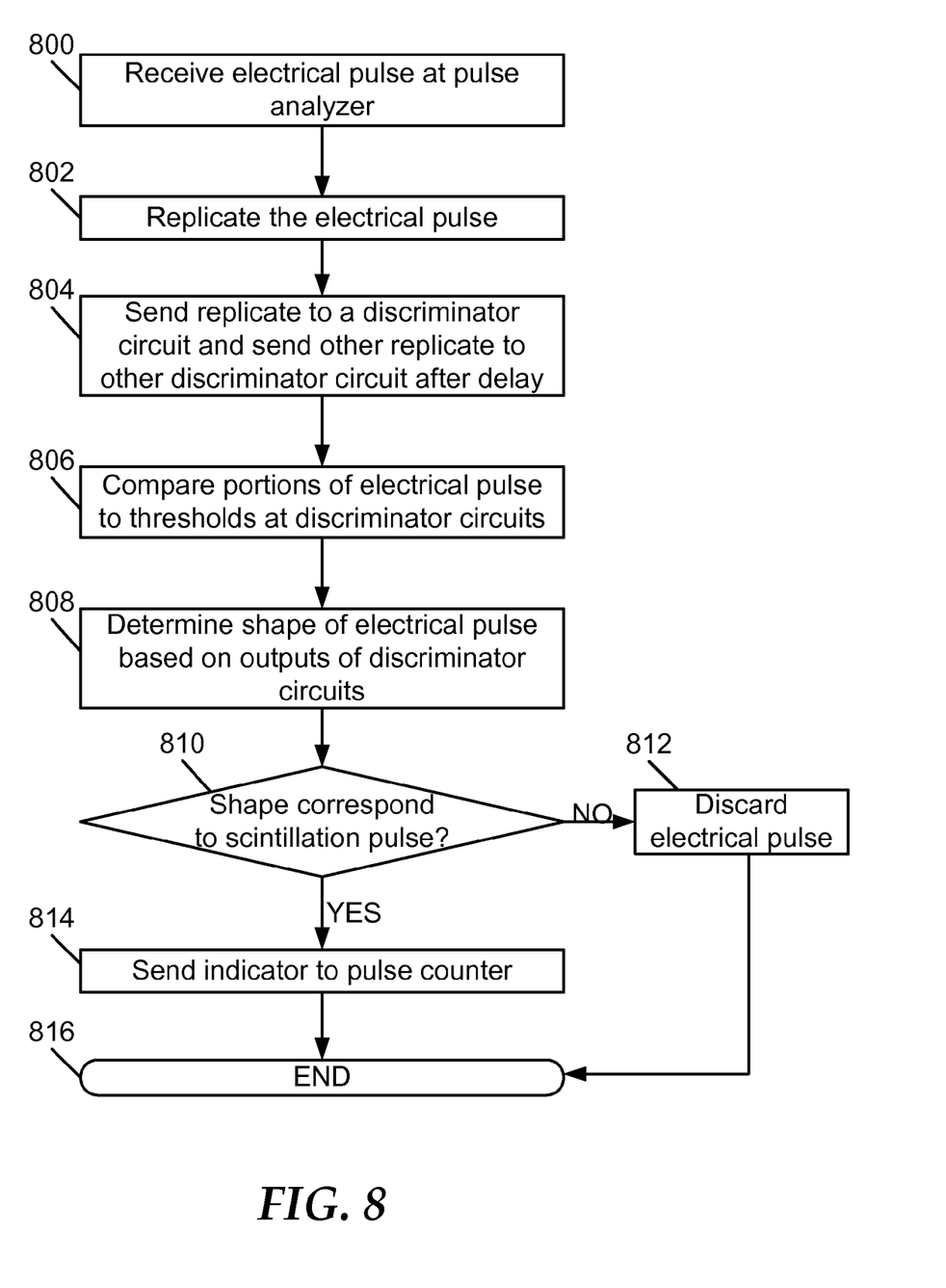
FIG. 8 is a flow diagram illustrating another particular embodiment of a method of sensing noise at a radiation detector.

FIG. 8 illustrates another particular embodiment of a method of using a radiation detector. At block 800, a pulse analyzer receives an electrical pulse from a photosensor. Moving to block 802, the pulse analyzer can replicate the electrical pulse. In one embodiment, the pulse analyzer can include a splitter coupled to an analog circuit, such as a plurality of discriminator circuits. Proceeding to block 804, the pulse analyzer can send a replicate to a discriminator circuit and can send another replicate to another discriminator circuit after a delay. Continuing to block 806, portions of the electrical pulse are compared to thresholds at the discriminator circuits. For instance, a proportion of a reading at a first portion of the electrical pulse replicate, to a highest reading of the electrical pulse replicate, can be compared to a threshold at the discriminator circuit, and a proportion of a reading at a second portion of the electrical pulse replicate, to the peak reading of the electrical pulse can be compared to another threshold at the other discriminator circuit. Additional portions of the electrical pulse can be compared to additional thresholds at additional discriminator circuits to further indicate a shape of the electrical pulse.

Advancing to block 808, a shape of the electrical pulse can be determined based on the outputs of the discriminator circuits. For example, a discriminator circuit whose threshold is met or exceeded by a portion of the electrical pulse can output a signal, while another discriminator circuit whose threshold is not met or exceeded by another portion of the electrical pulse may not output a signal. If each of a first subset of a plurality of discriminator circuits outputs a signal, the shape of the electrical pulse can substantially correspond to a scintillation pulse.

Continuing to decision node 810, the pulse analyzer determines whether the shape of the electrical pulse corresponds to a scintillation pulse. If the shape does not correspond to a scintillation pulse, such as when the shape of the electrical pulse corresponds to a noise pulse, the method can advance to block 812, and the pulse analyzer substantially prevents an indicator from being received at a pulse counter. Conversely, if the shape corresponds to a scintillation pulse, the method moves to block 814, and the pulse analyzer sends the electrical pulse to the pulse counter. In an example, a gate can send the electrical pulse, or an indicator related to the electrical pulse, to a pulse counter when the gate receives output signals from each of a first subset of the plurality of discriminator circuits. In another example, the gate can substantially prevent the pulse counter from receiving the electrical pulse, or an indicator related to the electrical pulse, when the gate does not receive output signals from each of a first subset of the plurality, or when the gate receives an output signal from a second subset of the plurality of discriminator circuits. The method terminates at 816.

Figure 9:
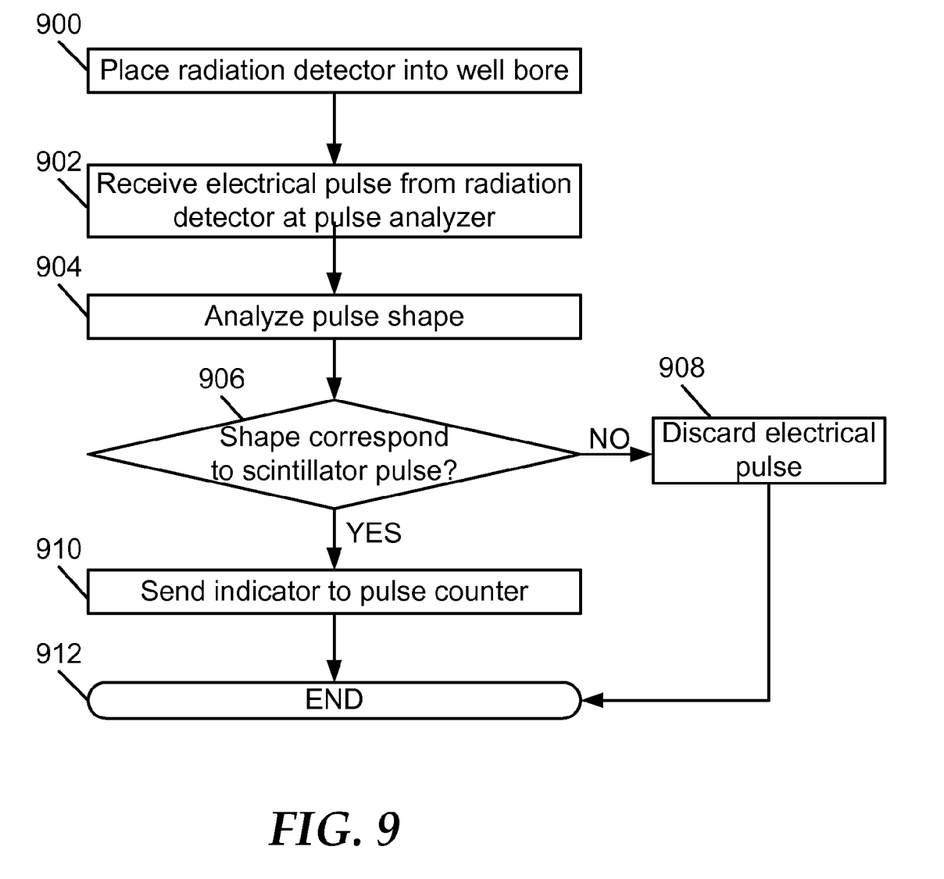
FIG. 9 is a flow diagram illustrating another particular embodiment of a method of sensing noise at a radiation detector.

FIG. 9 illustrates another embodiment of a method of using a radiation detector. At block 900, a radiation detector can be placed in a well bore. Moving to block 902, a pulse analyzer receives an electrical pulse from the radiation detector. In an embodiment, the pulse analyzer can be outside the well bore. In another embodiment, the pulse analyzer can be placed into the well bore with the radiation detector. For instance, the pulse analyzer can be within a housing containing a photosensor of the radiation detector. Proceeding to block 904, the pulse analyzer analyzes a shape of the electrical pulse. Pulse shape analysis can be performed using a digital circuit, an analog circuit, or any combination thereof.

Continuing to decision node 906, the pulse analyzer can determine whether the shape of the electrical pulse corresponds to a scintillation pulse. If the shape does not correspond to a scintillation pulse, such as when the shape of the electrical pulse corresponds to a noise pulse, the method can advance to block 908, and the pulse analyzer can discard the electrical pulse. Conversely, if the shape corresponds to a scintillation pulse, the method moves to block 910, and the pulse analyzer can send the electrical pulse to the pulse counter. The method ends at 912.

In conjunction with the configuration and structure disclosed herein, a radiation detector is provided having a pulse analyzer to determine whether an electrical pulse output by a photosensor corresponds to a scintillation pulse or a noise pulse and to substantially prevent a pulse counter from receiving the electrical pulse, a replicate of the electrical pulse, an indicator, or any combination thereof, when the electrical pulse corresponds to a noise pulse. The pulse analyzer can include a digital circuit, an analog circuit, or any combination thereof.

In a particular embodiment, the pulse analyzer may send no more than 2% of noise pulses to the pulse counter when the photosensor is at a temperature of from approximately room temperature (from approximately 20° C. to approximately 25° C.) to approximately 200° C., such as during well logging applications. In some embodiments, a pulse analyzer that includes discrete analog components can be used at higher temperatures, as packaging and other materials associated with integrated circuits can melt or otherwise fail at temperatures above approximately 125° C. Further, the pulse analyzer can send no more than 1% of noise pulses to the pulse counter when the photosensor is at room temperature. In addition, the pulse analyzer can send no more than 5% of noise pulses to the pulse counter when the photosensor includes a semiconductor electron sensor and is at approximately room temperature.

In some embodiments, the radiation detector can be used in applications where signal-to-noise ratios are relatively low, such that conventional radiation detectors could not be used to obtain reliable data. Such applications include relatively low energy radiation, relatively high temperatures, or both. For instance, in a well logging environment, the pulse analyzer can allow the pulse counter to count scintillation pulses when the gamma ray has an energy below approximately 40 keV and the radiation detector device is at a temperature of from approximately room temperature to approximately 200° C. Typically, a signal-to-noise ratio for gamma rays having an energy below approximately 40 keV is too low to count scintillation pulses in well logging environments. In addition, when not in a well logging or other high noise environment, the pulse analyzer can allow the pulse counter to count scintillation pulses when the gamma ray has an energy below approximately 20 keV and the radiation detector device is at a temperature of from approximately room temperature to approximately 125° C. Further, the pulse analyzer can allow the pulse counter to count scintillation pulses when the gamma ray has an energy below approximately 5 keV, such as from approximately 2 keV to approximately 5 keV, and the radiation detector device is at approximately room temperature. Typically, 5 keV is the limit at room temperature at which gamma ray scintillation pulses can be counted without being drowned out by noise.

In still other embodiments, the radiation detector can provide data having a higher level of confidence that the data is accurate. Thus, the likelihood of having a classification error, with respect to a scintillation or noise pulse, can be significantly reduced or potentially eliminated.

Many different aspects and embodiments are possible. Some of those aspects and embodiments are described below. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa.

According to a first aspect, a radiation detector can include a photosensor to receive light via an input and to send an electrical pulse via an output in response to receiving the light. The radiation detector can also include a pulse analyzer to send an indicator to a pulse counter when the electrical pulse corresponds to a scintillation pulse and to not send the indicator to the pulse counter when the electrical pulse corresponds to a noise pulse. The pulse analyzer can be coupled to the output of the photosensor.

In an embodiment of the first aspect, the pulse analyzer can be configured to identify the electrical pulse as corresponding to the scintillation pulse or to the noise pulse based on a shape of the electrical pulse.

For instance, the pulse analyzer includes a digital circuit to analyze a portion of the electrical pulse and to determine whether the electrical pulse corresponds to the scintillation pulse or to the noise pulse. In an example, the digital circuit includes a field programmable gate array. The field programmable gate array can operate at a frequency of at least approximately 100 MHz.

In another embodiment of the first aspect, the circuit can be configured to identify the electrical pulse as corresponding to the scintillation pulse or to the noise pulse based on readings during a rise time of the electrical pulse. For instance, the circuit can be configured to identify the electrical pulse as a scintillation pulse when the rise time of the electrical pulse is at most approximately 50 ns. In another embodiment of the first aspect, the circuit can be configured to identify the electrical pulse as corresponding to the scintillation pulse or to the noise pulse based on a decay time of the electrical pulse. For example, the circuit can be configured to identify the electrical pulse as the scintillation pulse when the decay time of the electrical pulse is at least approximately 10 ns.

In another embodiment of the first aspect, the photosensor comprises a photodiode or a photomultiplier tube (PMT). The PMT can include, for example, a hybrid PMT having a photocathode and an electron sensor comprising a semiconductor.

In another embodiment of the first aspect, the pulse analyzer can be adapted to send no more than 2% of noise pulses to the pulse counter when the photosensor is at a temperature of from approximately room temperature to approximately 200° C. In another embodiment of the first aspect, the pulse analyzer can be adapted to send no more than 1% of noise pulses to the pulse counter when the photosensor is at approximately room temperature.

In another embodiment of the first aspect, the scintillation pulse can correspond to an emission of light from a scintillator coupled to the photosensor, in response to a gamma ray being received by a scintillating material, and wherein the scintillating material includes a lanthanum bromide or a bismuth germanate.

In another embodiment of the first aspect, the pulse analyzer can be configured to distinguish the scintillation pulse from the noise pulse when the gamma ray has an energy below 40 keV and the radiation detector device is at a temperature of from approximately room temperature to approximately 200° C.

In another embodiment of the first aspect, the pulse analyzer can be configured to distinguish the scintillation pulse from the noise pulse when the gamma ray has an energy below 20 keV and the radiation detector device is at a temperature of from approximately room temperature to approximately 125° C.

In another embodiment of the first aspect, the pulse analyzer can be configured to distinguish the scintillation pulse from the noise pulse when the gamma ray has an energy below 5 keV and the radiation detector device is at approximately room temperature.

In another embodiment of the first aspect, the pulse analyzer includes an analog circuit configured to substantially prevent the electrical pulse from being received at the pulse counter when the electrical pulse corresponds to the noise pulse. For example, the circuit can include a plurality of discriminator circuits, each discriminator circuit to receive a replicate of the electrical pulse at a different time and to compare a different portion of the electrical pulse to a threshold of the discriminator circuit. The electrical pulse can correspond to the scintillation pulse when each of a first subset of the plurality of discriminator circuits determines that an amplitude of a portion of the electrical pulse exceeds its threshold.

In another embodiment of the first aspect, a first of the plurality of discriminator circuits can be coupled to a first delay circuit and a second of the plurality of discriminator circuits can be coupled to a second delay circuit. The first delay circuit can have a greater inductance or resistance-capacitance time constant than the second delay circuit. The first of the plurality of discriminator circuits can receive a replicate of the electrical pulse before the second of the plurality of discriminator circuits receives another replicate of the electrical pulse.

In another embodiment of the first aspect, the circuit can include a gate coupled to the plurality of discriminator circuits, the gate to substantially prevent the electrical pulse from being received at the pulse counter when outputs of the plurality of discriminator circuits indicate that a shape of the electrical pulse does not correspond to the scintillation pulse. For example, the shape can correspond to the scintillation pulse when the shape includes a slope of at least approximately 10 photon/ns during a rise of the electrical pulse. In another example, the shape can correspond to the scintillation pulse when a decay time of the electrical pulse is at least 10 ns.

In another embodiment of the first aspect, a voltage amplifier can be coupled between the photosensor and the circuit. In another embodiment of the first aspect, a splitter can be coupled between the photosensor and the circuit. In another embodiment of the first aspect, a frequency filter can be coupled between the photosensor and the circuit. The frequency filter can include a low pass filter, a high pass filter, or any combination thereof.

In another embodiment of the first aspect, the scintillation pulse can correspond to an emission of light from a scintillator in response to a gamma ray being received by a scintillating material, and wherein the scintillating material includes a gas tube, a sodium iodide, a cesium iodide, or a lutetium yttrium orthosilicate (LYSO).

In another embodiment of the first aspect, the noise pulse can correspond to light produced as a result of a vibration of a scintillating material, a shock to the scintillating material, a pressure applied to the scintillating material, a potential change across the scintillating material, a static discharge within the radiation detector, a temperature of the photosensor, a temperature of the scintillation material, a plurality of scintillation pulses that overlap, or any combination thereof.

In another embodiment of the first aspect, the pulse analyzer can be tuned based on a portion of the scintillation pulse corresponding to a scintillating material included in a scintillator coupled to the photosensor.

According to a second aspect, a method can include receiving an electrical pulse at a pulse analyzer from an output of a photosensor and determining whether the electrical pulse corresponds to a scintillation pulse or a noise pulse. The method can also include sending the electrical pulse to a pulse counter when the electrical pulse corresponds to a scintillation pulse and not sending the electrical pulse to the pulse counter when the electrical pulse corresponds to a noise pulse.

In an embodiment of the second aspect, the method can include identifying the electrical pulse as corresponding to the scintillation pulse or to the noise pulse based on a shape of the electrical pulse. For example, the method can include identifying the electrical pulse as corresponding to the scintillation pulse or to the noise pulse based on a rise time of the electrical pulse. In another example, the method can include identifying the electrical pulse as corresponding to the scintillation pulse or to the noise pulse based on a decay of the electrical pulse. In a particular embodiment, the shape of the scintillation pulse can substantially correspond to a mathematical expression:

$$\sum_i \kappa_i \left[ \text{Exp}\left(-\frac{t-t_o}{\tau_{di}}\right) - \text{Exp}\left(-\frac{t-t_o}{\tau_{ri}}\right) \right] + a_i$$

where $\kappa$ and $\alpha$ are constants, $t_o$ is the time of the beginning of the pulse, $\tau_d$ is a time constant describing the pulse decay, and $\tau_r$ is a time constant describing the rise of the pulse.

In another embodiment of the second aspect, the method can include digitizing the electrical pulse before identifying the electrical pulse as corresponding to the scintillation pulse or to the noise pulse based on the shape of the electrical pulse. For example, the method can include digitizing the electrical pulse in a plurality of bins, wherein each of the plurality of bins includes at most approximately 5 ns of the electrical pulse, such as at most approximately 2 ns of the electrical pulse.

In another embodiment of the second aspect, the method can include identifying the electrical pulse as corresponding to the scintillation pulse or to the noise pulse based on a rise time of the electrical pulse as compared to a decay time of the electrical pulse. For instance, the method can include identifying the electrical pulse as corresponding to the scintillation pulse when the decay time is at least 5 ns longer than the rise time. In another example, the method can include identifying the electrical pulse as corresponding to the scintillation pulse when a ratio of the rise time to the decay time is at most approximately 0.5. In a further example, the method can include identifying the electrical pulse as corresponding to the scintillation pulse when a ratio of photons/ns associated with a rise of the electrical pulse, to photons/ns associated with a decay of the electrical pulse, is at least approximately 2.

In another embodiment of the second aspect, the method can include replicating the electrical pulse and sending a first replicate of the electrical pulse to a first discriminator circuit and sending a second replicate of the electrical pulse to a second discriminator circuit via a delay circuit. The method can include comparing a first proportion to a first threshold at the first discriminator circuit, wherein the first proportion corresponds to a relative comparison of a reading at a first portion of the electrical pulse to a reading at or near a peak of the electrical pulse. Further, the method can include comparing a second proportion to a second threshold at the second discriminator circuit, wherein the second proportion corresponds to a relative comparison of a reading at a second portion of the electrical pulse to the reading at the peak of the electrical pulse. The method can also include determining a shape of the electrical pulse based on outputs of the first and second discriminator circuits. The method can also include identifying the electrical pulse as corresponding to the scintillation pulse or to the noise pulse based on the outputs of the first and second discriminator circuits.

In another embodiment of the second aspect, the method can include amplifying the electrical pulse before replicating the electrical pulse.

According to a third aspect, a method can include placing a radiation detector into a well bore, where the radiation detector includes a photosensor. The method can also include receiving at a pulse analyzer an electrical pulse from the photosensor and analyzing the electrical pulse to determine whether a shape of the electrical pulse substantially corresponds to a scintillation pulse. The method can also include sending the electrical pulse to a pulse counter when the shape of the electrical pulse substantially corresponds to a scintillation pulse and not sending the electrical pulse to the pulse counter when the shape of the electrical pulse corresponds to a noise pulse.

In an embodiment of the third aspect, the method can include placing the pulse analyzer into the well bore with the radiation detector. In another embodiment of the third aspect, the pulse analyzer can be outside the well bore.

In another embodiment of the third aspect, the method can include digitizing the electrical pulse before analyzing the electrical pulse to determine the shape of the electrical pulse. In another embodiment of the third aspect, the method can include identifying the electrical pulse as corresponding to the scintillation pulse or the noise pulse based on a rise time, a decay time, a comparison of rise time to decay time, a ratio of rise time to decay time, or any combination thereof, of the electrical pulse.

In another embodiment of the third aspect, the method can include analyzing the electrical pulse via an analog circuit. For instance, the method can include sending a first replicate of the electrical pulse to a first discriminator circuit and sending a second replicate of the electrical pulse to a second discriminator circuit via an analog delay circuit. The method can include comparing a first proportion to a first threshold at the first discriminator circuit, wherein the first proportion corresponds to a relative comparison of a reading at a first portion of the electrical pulse to a reading at a peak of the electrical pulse. Further, the method can include comparing a second proportion to a second threshold at the second discriminator circuit, wherein the second proportion corresponds to a relative comparison of a reading at a second portion of the electrical pulse to the reading at the peak of the electrical pulse. The method can also include identifying the electrical pulse as corresponding to the scintillation pulse or to the noise pulse based on the outputs of the first and second discriminator circuits.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A radiation detector comprising:
   a photosensor to receive light via an input and to send an electrical pulse via an output in response to receiving the light; and
   a pulse analyzer to send an indicator to a pulse counter when the electrical pulse corresponds to a scintillation pulse and to not send the indicator to the pulse counter when the electrical pulse corresponds to a noise pulse, wherein the pulse analyzer is coupled to the output of the photosensor;
   wherein the pulse analyzer includes a circuit configured to substantially prevent the electrical pulse from being received at the pulse counter unless the electrical pulse corresponds to a scintillation pulse, the circuit including a plurality of discriminator circuits, each discriminator circuit to receive a replicate of the electrical pulse at a different time, to compare a different portion of the electrical pulse to a threshold of the discriminator circuit, and to determine that an electrical pulse corresponds to a scintillation pulse when each of a first subset of the plurality of discriminator circuits determines that an amplitude of a portion of the electrical pulse exceeds its threshold.

2. The radiation detector of claim 1, wherein the pulse analyzer is configured to identify the electrical pulse as corresponding to the scintillation pulse or to the noise pulse based on a shape of the electrical pulse.

3. The radiation detector of claim 2, wherein the pulse analyzer includes a digital circuit to analyze a portion of the electrical pulse and to determine whether the electrical pulse corresponds to the scintillation pulse or to the noise pulse.

4. The radiation detector of claim 1, wherein the pulse analyzer is adapted to send no more than 2% of noise pulses to the pulse counter when the photosensor is at a temperature of from approximately room temperature to approximately 200° C.

5. The radiation detector of claim 1, wherein the scintillation pulse corresponds to an emission of light from a scintillator coupled to the photosensor, in response to a gamma ray being received by a scintillating material, and wherein the scintillating material includes a lanthanum bromide or a bismuth germanate.

6. The radiation detector of claim 1, wherein the pulse analyzer includes an analog circuit configured to substantially prevent the electrical pulse from being received at the pulse counter when the electrical pulse corresponds to the noise pulse.

7. The radiation detector of claim 6, further comprising a splitter coupled between the photosensor and the circuit.

8. The radiation detector of claim 6, further comprising a frequency filter coupled between the photosensor and the circuit.

9. The radiation detector of claim 8, wherein the frequency filter includes a low pass filter, a high pass filter, or any combination thereof.

10. The radiation detector of claim 1, wherein:
    a first of the plurality of discriminator circuits is coupled to a first delay circuit and a second of the plurality of discriminator circuits is coupled to a second delay circuit;
    the first delay circuit has a greater inductance or resistance-capacitance time constant than the second delay circuit; and
    the first of the plurality of discriminator circuits receives a replicate of the electrical pulse before the second of the plurality of discriminator circuits receives another replicate of the electrical pulse.

11. The radiation detector of claim 1, wherein the circuit includes a gate coupled to the plurality of discriminator circuits, the gate to substantially prevent the electrical pulse from being received at the pulse counter when outputs of the plurality of discriminator circuits indicate that a shape of the electrical pulse does not correspond to the scintillation pulse.

12. The radiation detector of claim 1, wherein the noise pulse corresponds to light produced as a result of a vibration of a scintillating material, a shock to the scintillating material, a pressure applied to the scintillating material, a potential change across the scintillating material, a static discharge within the radiation detector, a temperature of the photosensor, a temperature of the scintillation material, a plurality of scintillation pulses that overlap, or any combination thereof.

13. A method comprising:
    receiving an electrical pulse at a pulse analyzer from an output of a photosensor;
    determining whether the electrical pulse corresponds to a scintillation pulse or a noise pulse based on a shape of the electrical pulse, wherein the shape of a scintillation pulse substantially corresponds to a mathematical expression comprising:

$$\sum_i \kappa_i \left[ \mathrm{Exp}\left(-\frac{t-t_o}{\tau_{di}}\right) - \mathrm{Exp}\left(-\frac{t-t_o}{\tau_{ri}}\right) \right] + a_i$$

wherein:

$\kappa$ and $\alpha$ are constants;

$t_o$ is a time of a beginning of the pulse;

$\tau_d$ is a time constant describing a decay of the electrical pulse;

$\tau_r$ is a time constant describing a rise of the electrical pulse and a summation using the mathematical expression is performed over a set of time constants within the pulse;

sending an indicator to a pulse counter when the electrical pulse corresponds to a scintillation pulse; and not sending the indicator to the pulse counter when the electrical pulse corresponds to a noise pulse.

14. A method comprising:

receiving an electrical pulse at a pulse analyzer from an output of a photosensor;

determining whether the electrical pulse corresponds to a scintillation pulse or a noise pulse;

sending an indicator to a pulse counter when the electrical pulse corresponds to a scintillation pulse; and not sending the indicator to the pulse counter when the electrical pulse corresponds to a noise pulse;

wherein determining whether the electrical pulse corresponds to a scintillation pulse or a noise pulse comprises:

replicating the electrical pulse;

sending a first replicate of the electrical pulse to a first discriminator circuit and sending a second replicate of the electrical pulse to a second discriminator circuit via a delay circuit;

comparing a first proportion to a first threshold at the first discriminator circuit, wherein the first proportion corresponds to a relative comparison of a reading at a first portion of the electrical pulse to a reading at or near a peak of the electrical pulse;

comparing a second proportion to a second threshold at the second discriminator circuit, wherein the second proportion corresponds to a relative comparison of a reading at a second portion of the electrical pulse to the reading at or near the peak of the electrical pulse;

determining a shape of the electrical pulse based on the outputs of the first and second discriminator circuits; and identifying the electrical pulse as corresponding to the scintillation pulse or to the noise pulse based on the shape.

15. A method comprising:

placing a radiation detector into a well bore, wherein the radiation detector includes a photosensor;

receiving at a pulse analyzer an electrical pulse from the photosensor;

analyzing the electrical pulse to determine whether a shape of the electrical pulse substantially corresponds to a scintillation pulse;

sending an indicator to a pulse counter when the shape of the electrical pulse substantially corresponds to a scintillation pulse; and not sending the indicator to the pulse counter when the shape of the electrical pulse corresponds to a noise pulse;

wherein determining whether a shape of the electrical pulse substantially corresponds to a scintillation pulse comprises:

sending a first replicate of the electrical pulse to a first discriminator circuit and sending a second replicate of the electrical pulse to a second discriminator circuit via an analog delay circuit;

comparing a first proportion to a first threshold at the first discriminator circuit, wherein the first proportion corresponds to a relative comparison of a reading at a first portion of the electrical pulse to a reading at or near a peak of the electrical pulse;

comparing a second proportion to a second threshold at the second discriminator circuit, wherein the second proportion corresponds to a relative comparison of a reading at a second portion of the electrical pulse to the reading at or near the peak of the electrical pulse; and identifying the electrical pulse as corresponding to the scintillation pulse or to the noise pulse based on the outputs of the first and second discriminator circuits.

16. The method of claim 15, further comprising analyzing the electrical pulse using an analog circuit.

* * * * *